United States Patent Office 3,666,404
Patented May 30, 1972

3,666,404
METHOD OF INHIBITING CORROSION IN AQUEOUS SYSTEMS WITH HIGH MOLECULAR WEIGHT ALKYLENE OXIDE POLYMERS
Chin M. Hwa, Arlington Heights, Charles M. Bodach, Morton Grove, and C. D. Schroeder, Arlington Heights, Ill., assignors to Chemed Corporation, Cincinnati, Ohio
No Drawing. Filed Nov. 5, 1969, Ser. No. 874,397
Int. Cl. C23f *11/10, 11/18*
U.S. Cl. 21—2.7
8 Claims

ABSTRACT OF THE DISCLOSURE

High molecular weight polymers of ethylene oxide or copolymers of ethylene oxide with minor amounts of propylene oxide having a weight average molecular weight of at least about 100,000 but nevertheless water soluble at the concentrations and under the conditions of use, inhibit corrosion of metal surfaces in aqueous systems. Combination of such polymers with known corrosion inhibiting materials and compositions synergistically improves the effectiveness of the latter.

---

This invention relates to methods and compositions for inhibiting corrosion of metal surfaces in aqueous systems.

Corrosion is generally defined as the destructive attack of metals involving chemical or electrochemical reactions with environment. Oftentimes, however, the "wearing away" or deterioration of metals as a result of physical causes is also a significant problem, whether occurring essentially alone or accompanied by the more typical chemical or electrochemical attack.

For the purposes of the present disclosure the term "physically induced corrosion" is used broadly to include any one or more of the types of corrosive attacks in which physical forces are involved among which are included those described by most experts in the art as "impingement corrosion," "cavitation corrosion," "cavitation erosion" or "erosion corrosion."

"Impingement corrosion" is a form of electrochemical attack in which wearing away and undercutting (attack) of metal surfaces is accelerated in localized anodic areas, after the removal of protective oxide films by the action of an aqueous fluid flowing through or over a metallic surface under impinging water flow conditions. For example, it is known that copper and copper alloys are susceptible to impingement corrosion by high flow rate water or aqueous solutions. The impingement attack increases with increased temperature, increased velocity, increased anion concentrations such as chloride, and increased dissolved oxygen content. Becaue open recirculating cooling waters are air-saturated and often contain chloride, impingement corrosion of copper and copper alloys in these systems can be a serious problem if the water velocity is high.

"Cavitation corrosion" and "cavitation erosion" as used herein is meant to include the combined electrochemical-mechanical attack of metal surfaces when flow conditions of water or other aqueous fluid are such that repetitive vacuum or vapor filled cavities and high pressure areas are developed. When such "bubbles" form and collapse almost instantaneously at the water-metal interface they can create localized shock forces measuring as high as hundreds of tons per square inch. Cavitation conditions can be created by high velocity fluid flow past metal surfaces, by high velocity movement of metal surfaces through the fluid or by vibratory action. The metal surface typically becomes deeply pitted and may exhibit a spongy appearance. Cavitation corrosion is common on rotors of pumps, on the trailing faces of propellers and of water turbine blades, and on the cooling water side of diesel engine cylinder liners.

"Erosion Corrosion" is a severe problem which occurs when a process water containing suspended solids is handled using metal equipment or is transported in metal pipes or other conduits. Erosion-corrosion is characterized by repeated removal of protective oxide films on the metal surface exposing fresh metal to further corrosive attack. In mining, paper, and other industrial processes, frequent replacement of equipment is necessary due to erosion corrosion damage.

In a paper entitled "Water Analyses and Their Functions in Selecting Condenser Tube Alloys" (Tracy, Nole and Duffy; Paper No. 64–WA/CT–2 presented at the Winter Annual Meeting, New York, N.Y., Nov. 29–Dec. 3, 1964 of The Amreican Society of Mechanical Engineers) the authors state that alloys normally considered for condenser and heat exchanger tubes in power stations are Arsenical Copper, Red Brass–85 percent. Inhibited Admiralty, Inhibited Aluminum Brass, Aluminum Bronze–5 percent, and Cupro Nickel–10 percent or 30 percent. These authors further state that increasing water velocity tends to increase corrosion-erosion and impingement corrosion of copper alloys. A table is presented giving approximate maximum average velocity in feet per second for seawater flowing through condenser tubes as follows:

| | Maximum velocity (ft./sec.) |
|---|---|
| Inhibited Admiralty | 5–6 |
| Inhibited Aluminum Brass | 7–8 |
| Aluminum Bronze, 5 percent | 7–8 |
| Cupro Nickel, 10 percent | 8–10 |
| Cupro Nickel, 30 percent | 10–12 |
| Arsenical Copper | 3–4 |
| Red Brass, 85 percent | 3–4 |

A United States manufacturer and seller of water treatment chemicals provides the following data with respect to fresh water service in cooling water systems, citing the January 1965 issue of The Petroleum Engineer as source reference:

VELOCITIES FOR WATER ENTERING HEAT EXCHANGER TUBES

| Material of construction | Most favorable velocity (ft. per sec.) | General range (ft. per sec.) |
|---|---|---|
| Carbon steel | 4.0 | 2.5–6 |
| Red brass | 2.5 | 2.5–4 |
| Admiralty (inhibited) | 3.0 | 2.5–5 |
| Aluminum brass | 5.0 | 4–8 |
| 90–10 cupro nickel | 7.0–8.0 | 6–12 |
| 70–30 cupro nickel | 7.5 | 5–10 |
| Monel | 8.0 | 6–12 |
| Type 316 alloy steel | 10–0 | 8–15 |

A very extensive study of corrosion in cold and hot water distribution systems was conducted at Michigan State University in the late 1950's. The results of this study, comprising primarily a reprint of seven articles by Drs. Obrecht and Quill published in the January, March, April, May, July, September 1960 and April 1961 issues of Heating, Piping & Air Conditioning has been published by the Keeney Publishing Company, 6 North Michigan Avenue, Chicago 2, Ill. under the title "How Temperature, Velocity of Potable Water Affect Corrosion of Copper and its Alloys." The adverse effects of physically induced corrosion resulting from higher velocity flow rates in these studies is most apparent in the noted May 1960 article of the series.

It is an object of this invention to provide a method for inhibiting the physically induced or accelerated corrosion of metal surfaces in aqueous systems.

Another object of this invention is to provide a method for improving the corrosion inhibition effectiveness of known corrosion inhibiting materials or compositions.

Still another object of the invention is to provide new and improved corrosion inhibition compositions effective for minimizing physically induced or accelerated corrosion of metallic surfaces in aqueous systems.

Yet another object is to provide a method for increasing the permissible velocity of aqueous fluids in aqueous heat exchange systems.

Further objects and the many advantages of the present invention will be readily apparent from the ensuing detailed description.

In accordance with one aspect of the present invention it has been discovered that physically induced corrosion of metallic surfaces in aqueous systems can be greatly reduced, and/or the permissible velocity of aqueous fluids flowing in aqueous systems greatly increased, by maintaining in the water or other aqueous fluid flowing in said systems at least about 0.005 part per million (hereinafter "p.p.m.") of a polymer soluble therein at the concentrations used and under the prevailing conditions, said polymer having a weight average molecular weight of at least about 100,000 and being selected from the group consisting of ethylene oxide homopolymers and copolymers of ethylene oxide with minor amounts (about 5 to not more than about 25 weight percent) of propylene oxide.

In accordance with another aspect of the invention it has been discovered that the effectiveness in aqueous systems of known corrosion inhibiting materials or compositions of the chromate, phosphate, chromate-phosphate, zinc chromate, zinc-phosphate, zinc-organic, borate-nitrite, nitrite, silicate, organic and other types separately or in combination, is greatly improved by the addition thereto or the concurrent but separate use of sufficient amounts of the high molecular weight ethylene oxide or ethylene oxide-propylene oxide polymers to provide in the aqueous system being treated at least about 0.005 p.p.m. of the said polymer.

In accordance with still another aspect of this invention it has been discovered that new and improved compositions for inhibiting corrosion of metallic surfaces in aqueous systems, effective for inhibiting corrosion resulted from chemical and physical causes can be provided by adding to known corrosion inhibiting compositions of the types referred to above, sufficient amounts of the high molecular weight ethylene oxide or ethylene oxide-propylene oxide polymers also described above to provide in the aqueous system being treated at least about 0.005 p.p.m. of the said polymer.

In all of the foregoing aspects of the invention there is no maximum upper limit to the amount of polymer to be used except that which is dictated by practical considerations, especially expense of the treatment and the viscosity of the treated systems. In virtually all situations it will be found that polymer concentrations of not more than about 100 p.p.m. will be completely adequate for the intended purposes although concentrations as high as about 1,000 p.p.m. or even higher may be used if desired. Preferably the polymer concentration in the aqueous fluid being treated will be maintained between about 0.01 and about 10 p.p.m.

The ethylene oxide and ethylene oxide-propylene oxide polymers used in the practice of the present invention, and methods for preparing them, are known. Suitable preparation methods are disclosed for example, in Kirk-Othmer's "Encyclopedia of Chemical Technology," 2nd edition, volume 10, pages 654 et seq. (John Wiley & Sons, Inc., New York, 1966). High molecular weight poly(ethylene oxide) is commercially sold in the United States and elsewhere by Union Carbide Corporation and its affiliates or licenses under the trademark "POLYOX." Suitable POLYOX materials include those designated as POLYOX WSP N-10 (approximate molecular weight of 100,000), POLYOX WSR N-3000 (approximate molecular weight of 600,000), POLYOX WSR-301 (approximate molecular weight of 4,000,000), coagulant grade POLYOX (approximate molecular weight >5,000,000) and POLYOX FRA (approximate molecular weight 7,000,000). Preferably the polymers used will have a molecular weight of from 500,000 to about 10,000,000; especially from about 1,000,000 to about 7,000,000.

The compositions of this invention are useful for treating a variety of aqueous systems, that is, any aqueous system corrosive to metal surfaces in contact therewith. Suitable systems which can be treated according to this invention include water treatment systems, cooling towers, diesel engine cooling systems, water circulating systems for heating or cooling and the like; wherein fresh water, treated fresh water, brines, sea water, sewage effluents, industrial waste waters, and the like are circulated in contact with metal surfaces. The process of this invention is suitable for reducing the corrosion of iron, copper, aluminum, zinc, and alloys containing these metals such as steel and other ferrous alloys, brass, and the like which are in contact with corrosive aqueous systems.

All concentrations are given herein as weight percents unless otherwise specified. All molecular weights are weight average molecular weights unless otherwise specified.

Representative examples of the new and improved corrosion inhibition compositions of this invention are:

(a) Chromate type corrosion inhibitor.

| Ingredient | Weight percent | | |
|---|---|---|---|
| | Operable range | Preferred range | Optimum |
| Water | 42.5–93 | 57.5–72 | 64.9 |
| Sodium hydroxide | 2–16 | 8–12 | 10 |
| Sodium dichromate dihydrate | 5–40 | 20–30 | 25 |
| Poly(ethylene oxide) having a molecular weight of 7,000,000 | 0.005–1.5 | 0.01–0.5 | 0.1 |

(b) Phosphate corrosion inhibitor.

| Ingredient | Weight percent | | |
|---|---|---|---|
| | Operable range | Preferred range | Optimum |
| Sodium tripolyphosphate | 53–99.96 | 92–99.91 | 99 |
| Poly(ethylene oxide) having a molecular weight of 2,000,000 | 0.04–47 | 0.09–8 | 1 |

(c) Borate-nitrite type corrosion inhibitor.

| Ingredient | Weight percent | | |
|---|---|---|---|
| | Operable range | Preferred range | Optimum |
| Sodium tetraborate pentahydrate | 30–95 | 40–80 | 60 |
| Sodium nitrite | 5–70 | 20–60 | 40 |
| Poly(ethlene oxide) having a molecular weight of 600,000 | 0.01–0.14 | 0.04–0.12 | 0.08 |

(d) Zinc-phosphate type corrosion inhibitor.

| Ingredient | Weight percent | | |
|---|---|---|---|
| | Operable range | Preferred range | Optimum |
| Zinc sulfate monohydrate | 2–50 | 5–25 | 15 |
| Sodium hexameta phosphate | 45–97.8 | 74–94.3 | 84.2 |
| Poly(ethylene oxide) having a molecular weight of 1,000,000 | 0.2–5.0 | 0.7–1.0 | 0.8 |

(e) Silicate type corrosion inhibitor.

| Ingredient | Weight percent | | |
|---|---|---|---|
| | Operable range | Preferred range | Optimum |
| Sodium metasilicate | 50–99.96 | 84–99.8 | 98 |
| Poly(ethylene oxide) having a molecular weight of 100,000 | 0.04–50 | 0.2–16 | 2 |

(f) Organic type corrosion inhibitor.

| Ingredient | Weight percent | | |
|---|---|---|---|
| | Operable range | Preferred range | Optimum |
| Poly(ethylene oxide) having a molecular weight of 600,000 | 0.001–2 | 0.01–0.2 | 0.05 |
| Sodium benzoate | 98–99.999 | 99.8–99.99 | 99.95 |

In connection with chromate type inhibitors, typically based on the use of water soluble alkali metal or ammonium chromates, the improved compositions and methods of this invention are formulated and/or used in proportions providing from about 5 to about 2,000 p.p.m. hexavalent chromate ion and from 0.01 to 100 p.p.m. of poly(ethylene oxide) homopolymer or copolymer. Nitrite type compositions, typically based on water soluble alkali metal or ammonium nitrites, are formulated and/or used in proportions providing from about 100 to about 3,000 p.p.m. nitrite ion and about 0.01 to about 100 p.p.m. of the said polymer or copolymer.

The compositions of this invention inhibit chemical and physically induced or accelerated corrosive attack of metals in contact with aqueous liquids. The compositions of this invention in aqueous solutions inhibit corrosion of metal parts in contact therewith in systems such as heat exchangers, diesel engine jackets, and pipes; and particularly inhibit physically induced or accelerated and chemical corrosive attack of iron base alloys, copper alloys, and aluminum alloys in contact with water or aqueous solutions.

One area of application for the present invention which is of special interest is in the inhibition of impingement corrosion and/or erosion-corrosion from high velocity aqueous cooling fluids flowing in copper alloy condenser tubing used in various utilities. Polymer concentrations as low as 0.01 p.p.m. appear to be effective for this application.

The polymers are also effective in closed cooling water systems. In particular they have been found to be effective at concentrations of from about 1 to about 10 p.p.m. for the inhibition of cavitation erosion frequently observed in diesel engine cooling jackets.

In open recirculating cooling water systems the high molecular weight polymers are typically used in conjunction with known corrosion inhibitors.

EXAMPLES 1–4

An aqueous solution containing one weight percent sodium chloride was circulated through a copper tube ½ inch in diameter and 10 inches long at a flow rate providing an average linear velocity of 28.3 feet per second. The use of a sodium chloride solution gave especially aggravated conditions in view of the known fact that impingement attack increases with chloride ion concentrate in aerated water. The corrosion tests were run for 7 days at 77° Fahrenheit. The copper tube was weighed before and after each test to determine the metal loss. The following experimental data show the effectiveness of a poly(ethylene oxide) having a molecular weight of approximately 7,000,000 as a corrosion inhibitor.

| Example No. | Additive | Weight loss in grams | Percent reduction in metal loss |
|---|---|---|---|
| | Blank (no treatment) | 2.8003 | |
| 1 | Ethylene oxide polymer, 0.1 p.p.m. | 1.4634 | 47.7 |
| 2 | Ethylene oxide polymer, 1.0 p.p.m. | 0.8069 | 71.2 |

Similar reduction in metal loss is obtained with the use of the following water soluble polymers.

Example 3: Poly(ethylene oxide) having a molecular weight of approximately 10,000,000.

Example 4: A copolymer of ethylene oxide and propylene oxide (about 10 percent by weight of propylene oxide) having a molecular weight of approximately 500,000.

EXAMPLES 5–14

These examples demonstrate the synergistic reduction in metal loss obtained with the compositions of this invention.

During the experiments, an aqueous solution containing 1 percent sodium chloride was circulated through a steel tube ½ inch in diameter and 10 inches long at a flow rate providing an average linear velocity of 22.7 feet per second. The tube is constructed of SAE.1015 carbon steel which has the chemical compositions of carbon 0.13–0.18%, manganese 0.30–0.60%, phosphorus 0.04% maximum, and sulfur 0.05% maximum. The corrosion tests were run for 7 days at 77° Fahrenheit. The steel tube was weighed before and after test to determine the metal loss due to corrosion.

| Example number | Additive | Weight loss in grams |
|---|---|---|
| Comparative | Sodium dichromate, 11 p.p.m. | 4.9673 |
| 5 | Sodium dichromate, 11 p.p.m. Ethylene oxide polymer having a molecular weight of 7,000,000, 1 p.p.m. | 0.3785 |
| 6 | Sodium dichromate, 11 p.p.m. Ethylene oxide polymer having a molecular weight of 600,000, 1 p.p.m. | 0.2661 |

Similar synergistic reduction in metal loss is obtained with the use of the following inhibitor combinations.

Example 7: Sodium tripolyphosphate 93%, poly(ethylene oxide) having a molecular weight of 100,000—7%.

Example 8: Sodium hexametaphosphate 98%, copolymer of ethylene oxide and propylene oxide (95/5 by weight, respectively) having a molecular weight of 200,000—2%.

Example 9: Sodium tetraborate decahydrate 64.92%, sodium nitrite 35%, poly(ethylene oxide) having a molecular weight of 1,000,000—0.08%.

Example 10: Zinc sulfate monohydrate 20%, sodium hexametaphosphate 79.3%, poly(ethylene oxide) having a molecular weight of 500,000—0.7%.

Example 11: Sodium metasilicate pentahydrate 95%, poly(ethylene oxide) having a molecular weight of 100,000—5%.

Example 12: Sodium metasilicate 97%, copolymer of ethylene oxide and propylene oxide (80/20 by weight, respectively) having a molecular weight of 1,000,000—3%.

Example 13: Benzoic acid 99.5%, poly(ethylene oxide) having a molecular weight of 800,000—0.5%.

Example 14: Sodium benzoate 99.9%, poly(ethylene oxide) having a molecular weight of 2,000,000—0.1%.

It has been found, as illustrated by the foregoing examples, that the permissible velocity of aqueous fluids flowing in metallic heat exchange equipment is increased by at least about 10 percent, more frequently as much as at least 25 percent to 50 percent, and often up to as much as 100 percent or more over the permissible velocities presently recommended by those skilled in the art.

What is claimed is:

1. A method which consists of reducing corrosion of flowing water on metal surfaces in contact therewith, said corrosion being by impingement, cavitation or erosion, by maintaining in the flowing water at least about 0.005 part per million of a water soluble polymer having a weight average molecular weight of at least about 100,000 to about 7,000,000, and selected from the group consisting of ethylene oxide homopolymers, and copolymers of ethylene oxide with about 5 to about 25 weight percent of propylene oxide.

2. The method of claim 1 wherein the polymer is poly (ethylene oxide).

3. The method of claim 2 wherein the average molecular weight of the polymer is from about 1,000,000 to about 7,000,000.

4. The method of claim 2 wherein the polymer concentration is from about 0.01 to about 10 parts per million.

5. A method which consists of reducing corrosion of flowing water on metal surfaces in contact therewith, said corrosion being by impingement, cavitation or erosion, by maintaining in the flowing water a corrosion inhibiting composition which comprises:
  (i) a water-soluble corrosion inhibiting composition selected from the group consisting of alkali metal chromate, zinc chromate, alkali metal phosphate, zinc chromate, alkali metal phosphate, zinc phosphate, alkali metal borate, alkali metal nitrite, zinc sulfate; alkali metal silicate, benzoic acid, alkali metal benzoate and mixtures thereof; and
  (ii) sufficient amount of a high molecular weight polymer to provide at least about 0.005 part per million of said polymer in a water system to be treated, said polymer having a weight average molecular weight of at least about 100,000, and selected from the group consisting of ethylene oxide polymer, and copolymers of ethylene oxide with about 5 to about 25 weight percent of propylene oxide.

6. The method of claim 5 wherein the polymer is poly(ethylene oxide).

7. The method of claim 6 wherein the concentration of the polymer is about 0.01 to about 100 parts per million, and alkali metal chromate is present in an amount of about 5 to about 2,000 parts per million hexavalent chromate ion.

8. The method of claim 6 wherein the concentration of the polymer is about 0.01 to about 100 parts per million and alkali metal nitrite is present in an amount from about 100 to about 3,000 parts per million nitrite ion.

References Cited

UNITED STATES PATENTS

| | | | |
|---|---|---|---|
| 2,929,696 | 3/1960 | Barusch et al. | 252—396 |
| 3,265,623 | 8/1966 | Pines et al. | 252—389 |
| 3,347,797 | 10/1967 | Kuegemann et al. | 252—396 |

OTHER REFERENCES

"Chemical and Plastics Physical Properties," Union Carbide Corp., 1968, p. 29.

LEON D. ROSDOL, Primary Examiner

I. GLUCK, Assistant Examiner

U.S. Cl. X.R.

210—59, 60; 252—8.55 E, 74, 75, 87, 181, 387, 389, 396